(12) United States Patent
Kalmuk et al.

(10) Patent No.: US 7,849,272 B2
(45) Date of Patent: Dec. 7, 2010

(54) DYNAMIC MEMORY MANAGEMENT IN AN RDMA CONTEXT

(75) Inventors: David Kalmuk, Toronto (CA); Jack Hon Wai Ng, Richmond Hill (CA); Hebert Walter Pereyra, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/958,144

(22) Filed: Dec. 17, 2007

(65) Prior Publication Data

US 2009/0157995 A1 Jun. 18, 2009

(51) Int. Cl.
G06F 12/02 (2006.01)
G06F 13/12 (2006.01)

(52) U.S. Cl. ............... 711/153; 709/216; 711/E12.009

(58) Field of Classification Search ................ 711/173, 711/2, E12.009, 153; 709/215, 216; 710/22, 710/28
See application file for complete search history.

(56) References Cited

U.S. PATENT DOCUMENTS

2006/0227799 A1* 10/2006 Lee ........................... 370/429
2006/0236063 A1* 10/2006 Hausauer et al. ............ 711/170
2008/0104337 A1* 5/2008 VelurEunni ................. 711/150

* cited by examiner

Primary Examiner—Matt Kim
Assistant Examiner—Hal Schnee
(74) Attorney, Agent, or Firm—Patterson & Sheridan, LLP

(57) ABSTRACT

A method for dynamically managing memory to support one or more processes executing in a remote direct memory access (RDMA) environment is provided. The method includes inserting a descriptor in a shared descriptor table, the descriptor corresponding to a block of memory allocated to a heap by an operating system. The method further includes, in response to allocating a portion of the block of memory from the heap to a process, determining whether the process has an existing registration with an application program interface for the block of memory. If the process has no existing registration, registering the process the process is registered with the application program interface and a registration corresponding to the block of memory is stored in a private registration table of the process. Additionally, the method includes, in response to the process releasing the allocated portion of the block of memory to the operating system, de-registering with the application program interface and removing the registration from the registration table. When the block of memory is released to the operating system, other registrations corresponding to the block of memory in other private registration tables of other processes remain in the other registration tables.

20 Claims, 6 Drawing Sheets

200

```
+++++++++++++++++
+ blockId  (64-bit integer value) +
+ blockPtr (Pointer value)        +
+ blockSz  (64-bit integer value  +
+++++++++++++++++
+ blockId  (64-bit integer value) +
+ blockPtr (Pointer value)        +
+ blockSz  (64-bit integer value  +
+++++++++++++++++
        . . .
+ blockId  (64-bit integer value) +
+ blockPtr (Pointer value)        +
+ blockSz  (64-bit integer value  +
+++++++++++++++++
```

Descriptor table block ptr →  `+++++++++++++++++++`
                                                           `+ descriptorEntry (integer value) +`
                                                           `+++++++++++++++++++`
Heap memory block ptr →  `+ Heap memory area                +`
                                                           `+                                 +`
                                                                         . . .
                                                           `+++++++++++++++++++`

```
++++++++++++++++++++
+ blockId     (64-bit integer value) +
+ lmrHandle   (uDAPL handle)         +
+ rmrHandle   (uDAPL handle)         +
+ lmrContext  (uDAPL context)        +
+ rmrContext  (uDAPL context)        +
+ blockSz     (64-bit integer value  +
++++++++++++++++++++
         . . .
+ blockId     (64-bit integer value) +
+ lmrHandle   (uDAPL handle)         +
+ rmrHandle   (uDAPL handle)         +
+ lmrContext  (uDAPL context)        +
+ rmrContext  (uDAPL context)        +
+ blockSz     (64-bit integer value  +
++++++++++++++++++++
```

FIG. 4

DYNAMIC MEMORY MANAGEMENT IN AN RDMA CONTEXT

FIELD OF THE INVENTION

The present invention is related to the field of computer memory management, and more particularly, to the dynamic management of computer memory in the context of Remote Direct Memory Access (RDMA) techniques and technologies.

BACKGROUND OF THE INVENTION

RDMA facilitates the transfer of data from the memory of one computer to the memory of another computer, typically utilizing operating system kernel-bypass input/output (I/O) and zero-copy data movement capabilities to achive high throughput, low latency networking. RDMA-based communication between different devices is an expanding and increasingly important component of many networking technologies currently being developed and deployed. RDMA-based communication can provide significant advantages over more conventional networking technologies, primarily due to the fact that RDMA permits resource costs associated with network-based communication processing to be offloaded from the primary central processing unit (CPU) of a device to a network interface card. This can remove a key bottleneck in communications processing. RDMA platforms can be exploited with software-implemented procedures using Application Program Interfaces (APIs) based on the User-Level Direct Access Programming Library (uDAPL) standard.

A key requirement of any such software-based procedure using RDMA is a requirement to "pin" regions of memory that are used for buffering data conveyed across a network. Perhaps the simplest technique for satisfying this requirement is to reserve a large area of memory for communications processing up front and to pin it for the lifetime of the particular software procedure or program. Since pinned memory must be backed by physical memory storage on the machine or device, however, and because this memory area may need to be quite large if the communications requirements of the program or procedure are extensive, this pinning of large portions of the memory can adversely impact the resources usage of the device. This, in turn, can result in an increased total resource cost of ownership for a user or other resource "customer." Moreover, if the program or procedure only has extensive communication processing requirements during certain peak workloads, then a significant amount of the memory is likely to be wasted during non-peak periods. Accordingly, it is advantageous to dynamically manage the memory used for RDMA using known dynamic memory management algorithms.

Attempting to dynamically manage memory used for RDMA communications, however, adds a new layer complexity to the typical dynamic memory management scheme. Specifically, a region of memory reserved by an operating system (OS) according to a dynamic memory management algorithm must be both registered and pinned before it can be used for RDMA communications. This registration is performed at the process level. Thus, in a multi-process system, if a block of memory that has been returned to the heap is subsequently re-reserved by another process, then that process also must register the block of memory before the block of memory can be used by the process. Releasing blocks of memory from the heap back to the OS becomes even more complex because each registered process also must perform a deregistration procedure of the block of memory. Typically, therefore, the dynamic memory management algorithm would need to signal each process that had previously registered the block of memory in a synchronous fashion in order to have each process release its registration when the dynamic memory management algorithm dictated release of the block of memory to the OS.

A simpler alternative would be to register individual blocks of memory as each is obtained from the heap and to deregister the same blocks of memory as each is returned, rather than registering larger blocks of memory within the heap as the blocks are allocated from the OS. This approach, however, has undesirable aspects in that the registration and deregistration processes can be performance-intensive, and registering blocks of memory as each is allocated from the heap rather than registering larger blocks of memory in the heap as each is allocated from the OS requires that many more individual registrations and de-registrations be performed. Moreover, in the specific context of uDAPL processes, because uDAPL requires the allocation of a separate memory block to store the uDAPL memory regions (MRs), this approach can greatly increase the memory overhead of the heap algorithm.

SUMMARY OF THE INVENTION

The present invention is directed to a system, apparatus, and methods for dynamically managing memory when data is exchanged between different computing devices according to RDMA-based technologies and techniques. It is an object of the invention to enhance the efficiency of memory management in the context of such RDMA technologies and techniques.

One embodiment of the invention is a computer-based system for dynamically managing memory to support one or more processes executing in a remote direct memory access environment. The system can include, in addition to a memory and a processor for executing at least one process, a descriptor module. The descriptor module can be configured to direct the processor to store a descriptor in a shared descriptor table, the descriptor uniquely corresponding to a block of the memory allocated to a heap.

Additionally, the system can include a registration module. The registration module can be configured to respond to a process request for an allocation of a portion of the block of memory from the heap by determining whether the process has an existing registration for the block of memory with an application program interface. If the process has no existing registration, the process can be registered with an application program interface by the process. As configured, the registration module can store a registration corresponding to the block of memory in a private registration table belonging to the process. The registration module can be further configured to remove the registration from the registration table in response to the process releasing the allocated portion of the block of memory to an operating system that runs on the processor. An aspect of the system is that when the block of memory is released to the operating system, other registrations corresponding to the block of memory in other private registration tables of other processes remain in the other registration tables. Yet another aspect of the invention is that the registration module, in response to a process request for an allocation of memory, can determine whether the process has a stale registration, and if so, can perform an appropriate de-registration.

Another embodiment of the invention is a method for dynamically managing memory to support one or more processes executing in an RDMA environment. The method can include inserting a descriptor in a shared descriptor table, the descriptor corresponding to a block of memory allocated to a heap by an operating system. The method also can further include, in response to allocating a portion of the block of memory from the heap to a process, determining whether the process has an existing registration with an application program interface for the block of memory, and if the process has no existing registration, registering the process with the application program interface and storing a registration corresponding to the block of memory in a private registration table of the process. In another embodiment, the method also can, in response to allocating memory from the heap to a process, determine whether the process has an existing stale registration, and if so perform de-registration as needed.

The method can further include de-registering with the application program interface and removing the registration from the registration table in response to the process releasing the allocated portion of the block of memory to the operating system. An aspect of the method is that, when the block of memory is released to the operating system, other registrations corresponding to the block of memory in other private registration tables of other processes remain in the other registration tables.

Yet another embodiment of the invention is a computer-readable storage medium. According to this embodiment computer-readable code can be embedded in the computer-readable storage medium for causing the computer, when the code is loaded into and executed by the computer, to insert a descriptor in a shared descriptor table, the descriptor corresponding to a block of memory allocated to a heap by an operating system; to determine, in response to allocating a portion of the block of memory from the heap to a process, whether the process has an existing registration with an application program interface for the block of memory, and if the process has no existing registration, to register the process with the application program interface and store a registration corresponding to the block of memory in a private registration table belonging to the process. The computer-readable code can further cause the computer to remove the registration from the registration table when the process deregisters with the application program interface and the allocated portion of the block of memory is released to the operating system. An aspect, again, is that when the block of memory is released to the operating system, other registrations corresponding to the block memory in other private registration tables of other processes remain in the other registration tables.

BRIEF DESCRIPTION OF THE DRAWINGS

There are shown in the drawings, embodiments which are presently preferred. It is expressly noted, however, that the invention is not limited to the precise arrangements and instrumentalities shown.

FIG. 2 is a schematic representation of an exemplary descriptor table, according to another embodiment of the invention.

FIG. 3 is a schematic representation of an exemplary memory block header, according to still another embodiment of the invention.

FIG. 4 is a schematic representation of an exemplary registration table, according to another embodiment of the invention.

DETAILED DESCRIPTION

Figure 1:
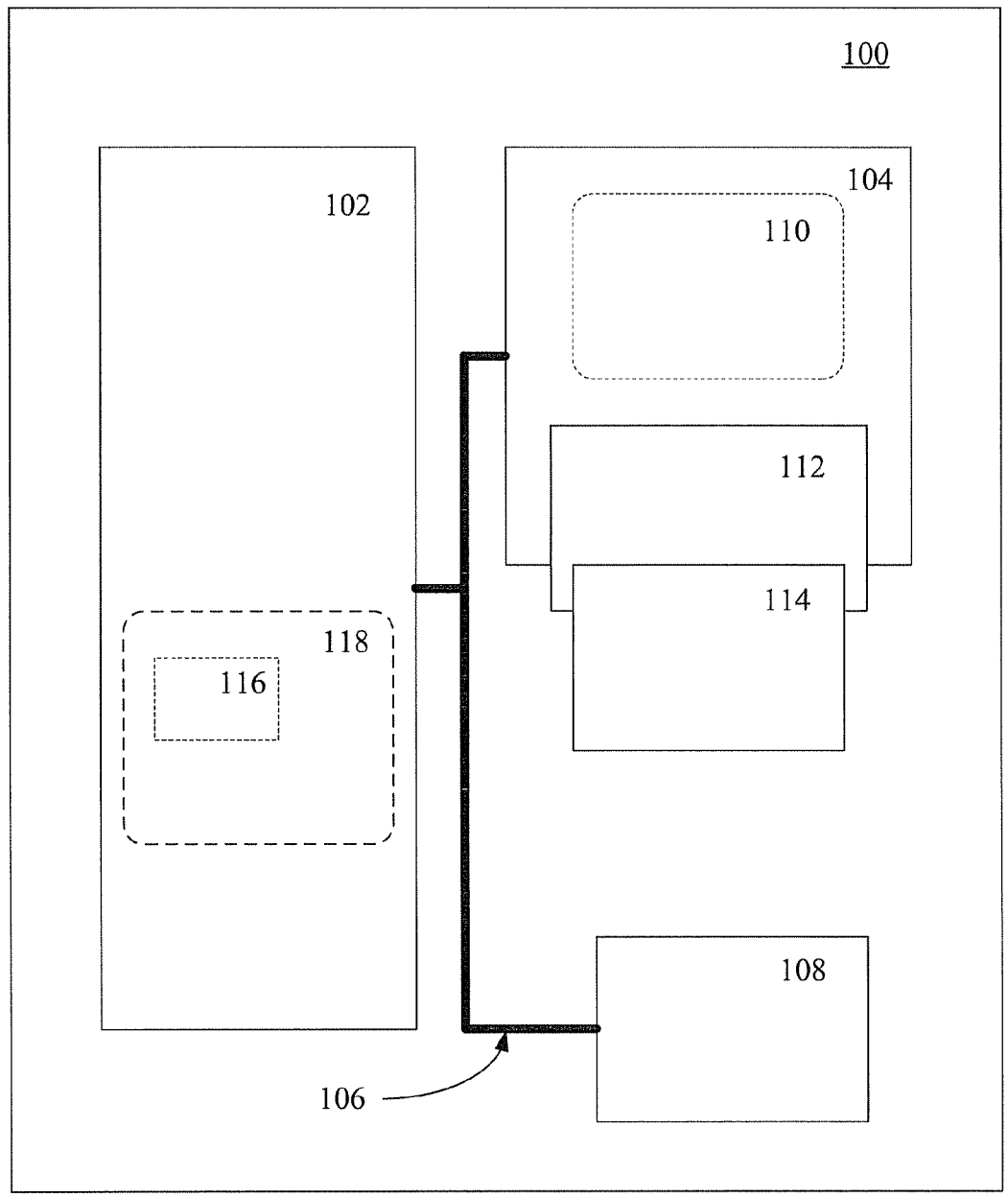
FIG. 1 is a schematic view of a system for dynamically managing memory in a remote direct memory access environment, according to one embodiment of the invention.

FIG. 1 is a schematic view of a computer-based system 100 for dynamically managing computer memory in of support one or more processes executing on a processor in a remote direct memory access environment, according to one embodiment of the invention. The 100 system illustratively includes a memory 102 for electronically storing executable processing instructions and a processor 104 in communication with the memory for executing at least one process based upon the executable processing instructions. Illustratively, the system 100 includes a bus 106 for communicatively linking the memory 102 and the processor 104 to one another, as well as to an input/output (I/O) device 108 through which data input and data output can be supplied. The system also illustratively includes an operating system (OS) 110 that comprises executable code that runs on the processor 104 at the system level and is configured to interact with the processes executed by the processor, as will be readily understood by one of ordinary skill in the art.

The system 100 further includes a descriptor module 112 as well as a registration module 114, each operably linked to the processor 104. One or both of the descriptor module 112 and the registration module 114 can be implemented in dedicated hard-wired logic circuitry for performing the procedures described herein when in communication with the processor 104. Alternately, however, one or both of the modules 112, 114 can be implemented in processor-executable code configured to execute on the processor 104 for performing the same procedures. In still another embodiment, one or the other or both the descriptor module 112 and the registration module 114 can implemented in a combination of hard-wired circuitry and processor-executable code.

Operatively, the descriptor module 112 is configured to cause the processor to store a descriptor in a shared descriptor table, which is described more particularly below. The descriptor so stored uniquely corresponds to a block of the memory 116 allocated to a heap 118. The registration module 114 is configured to respond to a process request for an allocation of a portion of the block of memory 116 from the heap 118 by determining whether the process has an existing registration for the block of memory 116 with an application program interface (API), and if the process has no existing registration, by storing a registration corresponding to the block of memory in a private registration table, which is also described more particularly below. Additionally, the registration module 114 can be configured to further determine whether an existing registration is a stale registration, and if so, to remove the stale registration as described more particularly below. It is noted that the registration table uniquely corresponds to a particular process, to which the portion of the block of memory 116 is allocated.

The registration module 114, moreover, is further configured to remove the registration from the registration table in response to the process releasing the allocated portion of the block of memory 116 to the OS 110 and de-registering with the API. It is worth emphasizing that when the block of memory is released to the OS, other registrations corresponding to the block of memory in other private registration tables of other processes remain in the other registration tables.

For each block of memory allocated to the heap 118, a descriptor is generated and entered in the descriptor table. Accordingly, each entry in the descriptor table corresponds to a block of memory allocated to the heap 118. The shared descriptor table can be accessed by all of the processes that execute on the processor 104. Every registration table generated, however, uniquely corresponds to a single process and is private to the particular process for which the registration table is generated. Thus, in one sense, the operative features of the descriptor module 112 and the registration module 114 cooperatively to provide a shared table of all memory blocks allocated to the heap by the OS 110, while also providing records of registrations at the process level for each allocation from the heap to an individual process.

The block of memory 116 in the heap 118 can be used to satisfy multiple memory allocation requests. Therefore, it is possible—indeed, likely in many instances—that multiple processes will ultimately be registered for the block of memory 116 by the time a heap-allocation procedure determines that the block is no longer needed and releases the block back to the OS 110. However, the freeing, or unpinning, of memory from the heap 118 so as to release it to the OS 110 is decoupled from the process of deregistration. A process can unpin allocated memory, de-register with respect to the allocation, and release the allocated memory to the OS 110 while leaving in place other registration of other processes with respect to the block of memory 116. Accordingly, the release of memory to the OS 110 can occur without inter-process synchronization. This can significantly enhance the efficiency of memory management and reduce the processing overhead otherwise arising when synchronization is needed.

This decoupling of the memory release and process deregistration is a feature of the uDAPL standard, and accordingly, the invention provides particular advantages in the context of uDAPL-based technologies. It is noted, however, that the invention is not limited to uDAPL-based technologies, but rather finds application with respect to other technologies that similarly decouple memory release and process deregistration.

Nonetheless, by leaving registrations intact, it is possible for stale registrations to remain after the block of memory 116 has been released back to the OS 110. Therefore, the registration module 114 can be configured to determine, prior to storing a registration in the registration table, whether the registration table contains a different registration. To determine whether it is a stale registration, reference is made to the descriptor table. If at a location in the registration table the registration table contains a different registration, then the registration is thus determined to be stale. The registration module 114 then removes the different registration from the registration table. As described more particularly below, the location in the registration table and the location in the descriptor table can be identified by a common location identifier (e.g., both locations can be identified by a common index value).

Thus, as a new block is allocated to the heap 118 and a process registers the newly-allocated block, a determination is made as to whether a previous registration was made at the same table entry; each process checks only is own registration table. When a memory block is released back to the OS, certain fields in the descriptor entry get reset/updated; in particular, blockPtr is set to NULL, blockSz is set to 0, and blockId is incremented by a predetermined integer value (e.g., 1) to make the descriptor entry ready for reuse. If there exists a stale registration, then the stale registration is purged. This procedure for purging old registrations provides an efficient mechanism for ensuring that no process will have more than a single registration per registration table entry.

In those instances in which the OS 110 allocates a memory block directly to the process, the registration module 114 can be configured to determine whether the registration table contains a different registration at a location in the registration table corresponding to a designated location of the descriptor in the descriptor table. If the registration table contains a different registration then it follows that this different registration is a stale registration, and accordingly, the registration module removes the different registration. Again, the location in the registration table and the location in the descriptor table can be identified by a common location identifier, as described more particularly below.

Referring additionally to FIG. 2, an exemplary version of the descriptor table 200 is shown. As illustrated, the descriptor table 200 can be represented, for example, by an array of entries, each entry storing information corresponding to each block of memory 116 allocated to the heap 118. The allocation can be performed according to various known algorithms implemented by a heap-allocation procedure. Each entry illustratively includes identification information denoted by blockId. A blockId is a 'refreshness' indicator of a memory block/descriptor that allows a process to tell whether or not its registration on the block/descriptor is stale. Solely for the purpose of exposition, the blockId is indicated as being a 64-bit integer value. Each entry of the descriptor table 200 further includes a blockPtr corresponding to the starting memory address of the block, as well as an indication of the size of the block as designated by blockSz, illustratively is another 64-bit integer. According to one embodiment, the system 100 can limit the maximum number of blocks, MAX_BLOCKS, that can permissibly be allocated to the heap. The size can be defined so as to be large enough to handle anticipated peak memory requirements of the system 100. The size of each block, BLOCK_SIZE, that is allocated by the heap-allocation procedure can likewise be specified. Specifically, in the context of a uDAPL environment, the size can be divisible by the page size of the OS 110 to ensure compatibility with uDAPL specifications.

According to one embodiment, the system 100 further includes a header-generating module, implemented in processor-executable code and/or hard-wired circuitry. The header-generating module is configured to generate a header corresponding to the block of memory 116. Referring additionally now to FIG. 3, an exemplary version of the header 300 is shown. Illustratively, the header 300 serves the function of an identifier that indicates for each particular block of memory a corresponding entry location in the descriptor table 200, each entry containing the above-described information pertaining to the particular block identified. The location of the corresponding block information in the descriptor table 200 is illustratively shown as being indicated by an integer value in the header 300. The identifier can also be used for locating the registration entry corresponding to the particular memory block in a registration table belonging to the process. The header 300, as further illustrated, can be added to the block of memory when the block is allocated to the heap by the OS 110.

An exemplary version of the registration table for a process is shown in FIG. 4. The registration table 400 includes a blockId corresponding to block of memory allocated to the heap with respect to which the particular process to which the registration table belongs has registered a memory allocation. Again, in the context of uDAPL, additional information pertaining to each entry can be included in the registration table 400 The additional information can include, for example: a uDAPL local memory region handle, lmrHandle; a uDAPL remote memory region handle, rmrHandle; a local memory region context, lmrContext; and a remote memory region context, rmrContext. Each entry in the registration table 400 indicates whether registration of a particular block has occurred with respect to the process to which the registration table corresponds.

Figure 5:
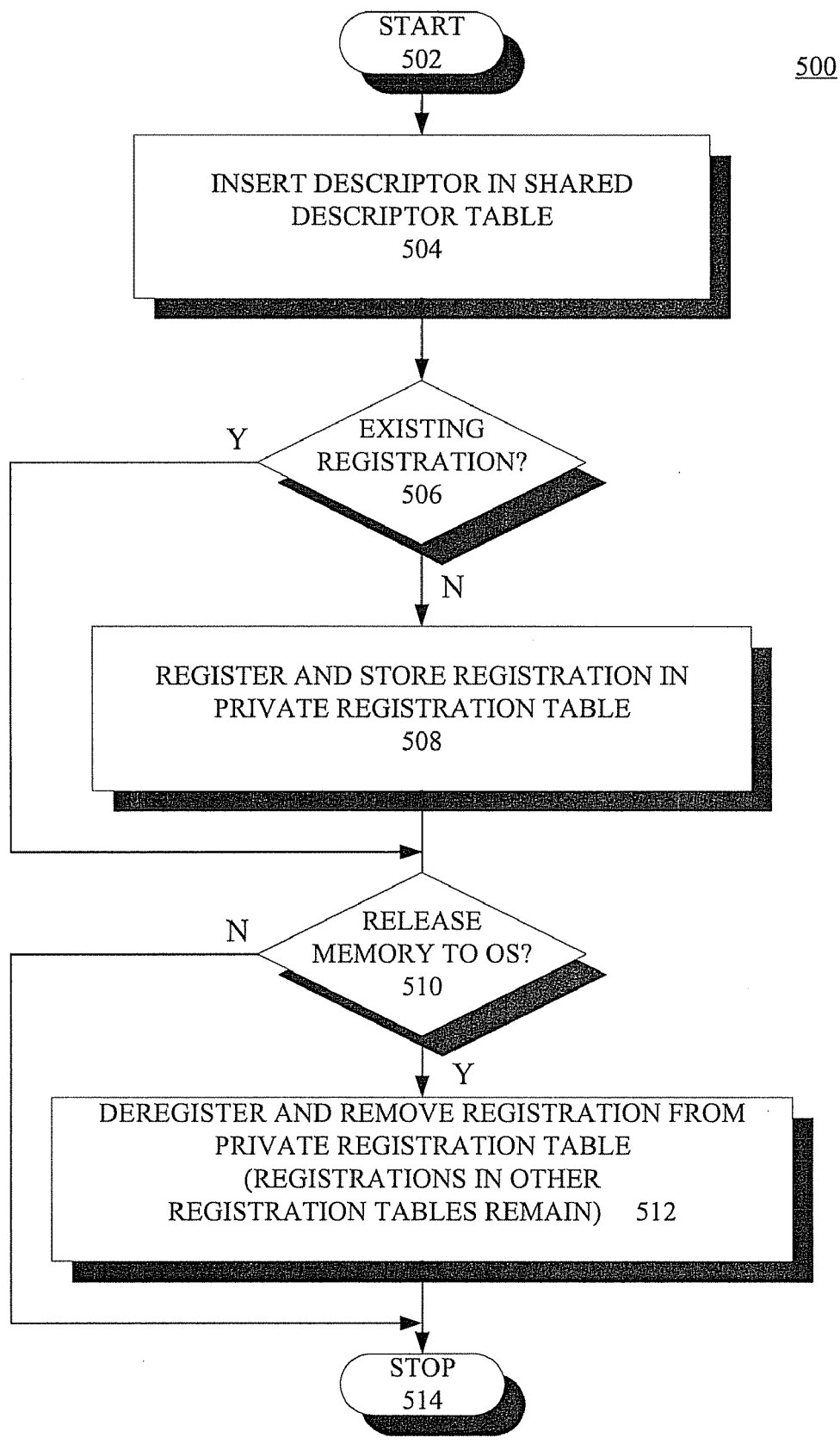
FIG. 5 is a flowchart of exemplary steps in a method for dynamically managing memory to support one or more processes executing in a remote direct memory access (RDMA) environment, according to yet another embodiment of the invention.

A method aspect of the invention is illustrated by the exemplary steps of the flowchart in FIG. 5. The method 500 dynamically manages computer memory in support of one or more processes executing in a remote direct memory access (RDMA) environment. After start, at 502, the method 500 includes inserting a descriptor in a shared descriptor table at step 504. The descriptor corresponds to a block of memory allocated to a heap by an operating system. The method 500 continues at step 506 by making a determination, in response to the allocation of a portion of the block of memory from the heap to a process, as to whether the process has an existing registration with an application program interface for the block of memory. If the process has no existing registration, the process is registered with the application program interface and, at step 508, a registration corresponding to the block of memory is stored in a private registration table uniquely corresponding to the process. If the process releases the allocated portion of the block of memory to the operating system at step 510, the process deregisters with the application program interface and, at step 512, the registration is removed from the registration table. However, when the block of memory is released to the operating system, other registrations corresponding to the block memory in other private registration tables of other processes remain in the other registration tables. The method 500 illustratively concludes at step 514.

The method 500 can include determining, prior to storing the registration, whether the registration table contains a different registration at a location in the registration table that corresponds to a location in the descriptor in the descriptor table. The location in the registration table and the location in the descriptor table can be identified by a common location identifier. If the registration table contains a different registration, the different registration is removed from the registration table.

When the operating system allocates a memory block directly to the process, the method 500 can respond by initially determining whether the registration table contains a different registration at a location in the registration table that corresponds to a location of the descriptor in the descriptor table. Again, the location in the registration table and the location in the descriptor table can be identified by a common location identifier. If the registration table contains a different registration, the method continues by removing the different registration.

The method 500 also can include generating a header corresponding to the block of memory. The header, more particular, can comprise a value indicating a location of the descriptor in the descriptor table and the location of the corresponding registration in the registration table belonging to the process. The step of generating the descriptor table can comprise generating the descriptor table such that the descriptor table comprises an entry at the indicated location. When one or more other blocks of memory are allocated to the heap, the method 500 can include generating one or more corresponding entries such that each entry uniquely corresponds to a single block of memory. The step of generating the descriptor table furthermore can comprise the step of generating, for a particular block of memory, an entry comprising: a block identifier identifying the particular block of memory; a block pointer pointing to a memory address of the particular block of memory; and a block size indicating the size of the particular block of memory.

Additionally, when the process comprises a plurality of processes, the method can include generating for each of the processes a corresponding registration table. Each of the processes so generated uniquely corresponds to a single process.

In the specific context of a uDAPL environment, wherein the application program interface conforms to the uDAPL standard, a separate portion of memory is allocated, this allocated portion defining a Local Memory Region (LMR), which is allocated for local memory access. The method 500 can include allocating the LMR along with another portion of memory defining a Remote Memory Region (RMR), which is allocated for remote memory access. It is noted that both the LMR and RMR require separate memory (outside of the memory block being allocated/registered) for creating a registration. The method can further include subsequently binding the LMR and RMR.

Obtaining Block of Memory from OS

Figure 6:
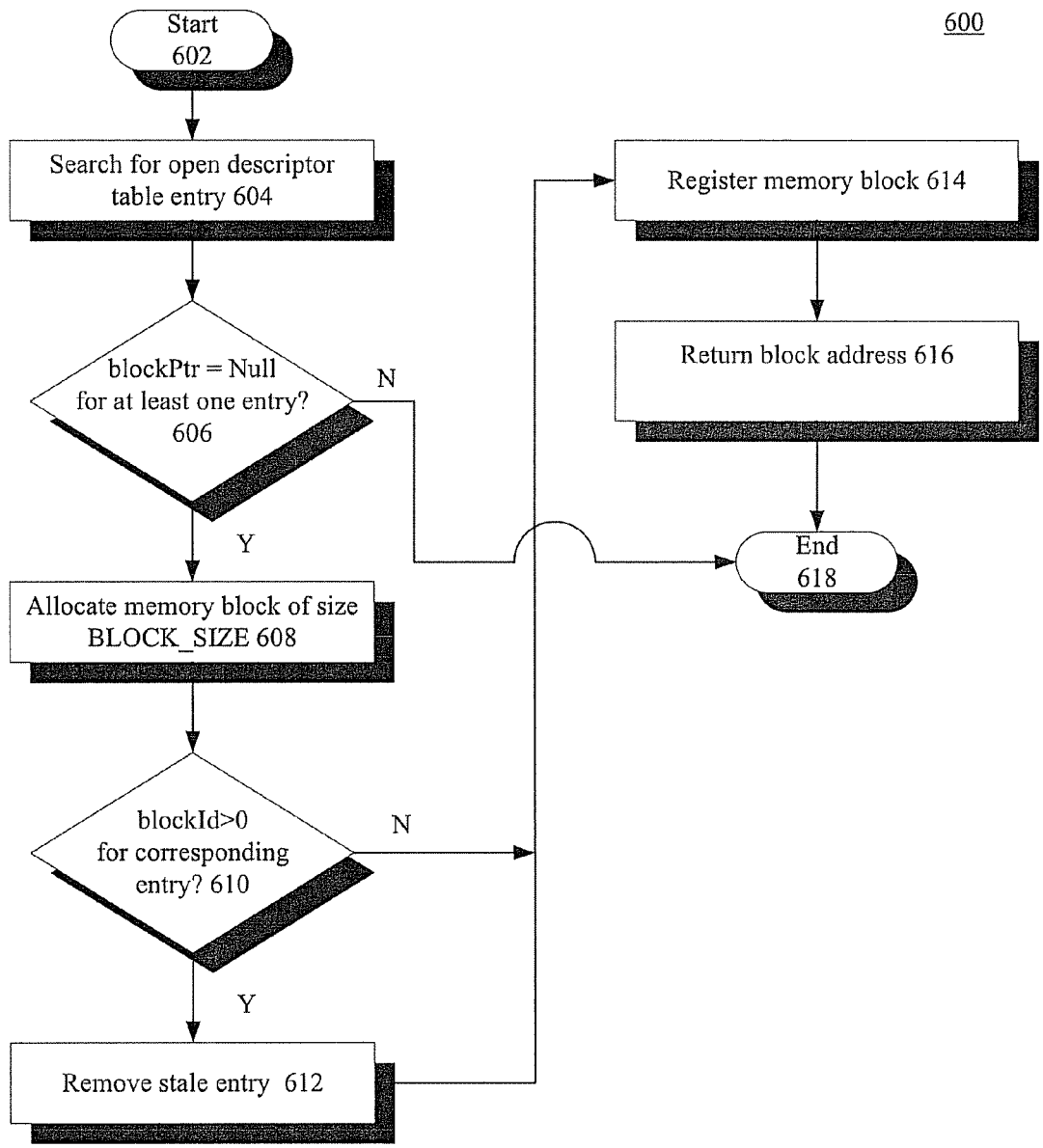
FIG. 6 is a flowchart of exemplary steps in a method for obtaining a block of memory from an operating system, to according still another embodiment of the invention.

FIG. 6 is a flowchart of exemplary steps in a method 600 for obtaining a block of memory from an operating system, according to still another embodiment of the invention. The method 600 provides a sequential process for handling the event that a heap-allocation procedure determines that a block of memory is to be allocated by the OS. It is assumed that any necessary setup needed by the heap-allocation procedure has already been performed, that a segment of shared memory has already been allocated for the descriptor table, and that all blockPtr values have been initialized to NULL and all blockID values initialized to one. It is further assumed that a registration table has been allocated for each process that has started to execute and that each entry in each registration table is initially zero.

After the start at step 602, the method continues at step 604 by searching the descriptor table for an open entry (i.e., where the blockPtr=NULL). If no open entry is found at step 606, the heap is at full capacity and no memory allocation to the heap can occur; the method halts by branching to step 618. In this event, the heap-allocation process should return an appropriate error message. In an alternative embodiment, a list of open entries can be maintained in shared memory. According to this embodiment, the next open entry from the list can be obtained, or an appropriate error message returned.

If is determined at step 606 that the heap is not at full capacity, then a block of memory of size BLOCK_SIZE is allocated from the OS to the heap at step 608 using an appropriate application program interface (API) and a descriptor is entered in the descriptor table. At this point in the procedure, the block header of the new memory block is not yet initialized. Thus, the position in the descriptor table at which the descriptor is to be entered is as yet an "open entry." The open entry can be indicated by the table index of the open entry in the descriptor table, as determined during the searching procedure described in the previous paragraph. The value of this position index (which, can be indicated by an integer value) can be stored in the descriptorEntry field in the header of the memory block. The size of the block of memory, as well as the pointer to the descriptor table entry, each corresponding to the block of memory. Note that the blockId value for the entry has been previously updated at initialization, or when the block of memory was last released from the heap, and thus the blockId already has the appropriate value.

The method 600 continues at step 610 by checking the corresponding entry in the registration table (i.e., one having the same index or other common table entry position locator) so as to determine whether blockID is greater than zero. If blockID is zero, then the registration table does not have a stale registration. In the specific context of the uDAPL environment, a stale registration corresponds to a stale memory region (MR) registration at this entry of the registration table. If no stale registration is found at step 610, the method 600 branches to step 614. Otherwise, the method 600 continues at step 612, at which point the stale registration is removed from the table. This can be accomplished in the uDAPL environment by calling an appropriate uDAPL API (DAT_RMR_FREE and DAT_LMR_FREE) to release the RMR and LMR using the handles in the registration table, after which the blockId in the registration table is set to zero. (Note the uDAPL standard dictates that the RMR be released before the LMR is released.) At step 614, the block of memory is registered. With uDAPL, this is accomplished by calling the appropriate uDAPL API to register the block of memory and obtain a new LMR and RMR; the appropriate uDAPL APIs are, in the order called, DAT_LMR_CREATE to create a new LMR, DAT_RMR_CREATE to create an RMR, and DAT_RMR_BIND to bind the RMR and the LMR. At step 616, the new address of the block returned. Thus at this step the memory is both pinned and registered. After this point, the heap-allocation procedure can perform any processing needed to store the block of memory, reserve the requested allocation size from the block, and return it to a user. In the uDAPL context, with the block of memory registered, the allocated memory can be used for RDMA communications. The method concludes at step 618.

Obtaining Block of Memory from Heap

Figure 7:
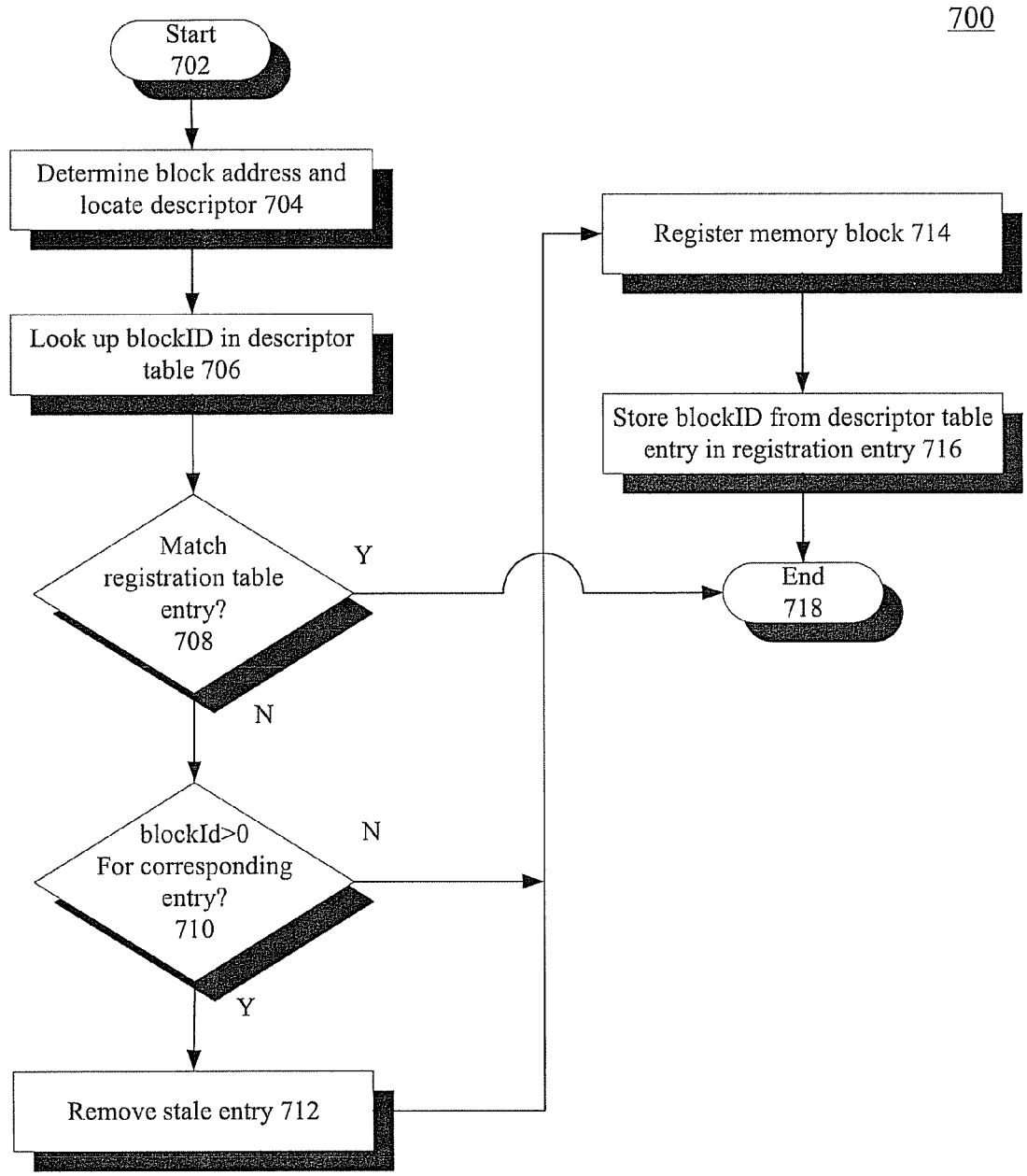
FIG. 7 is a flowchart of exemplary steps in a method for obtaining a block of memory from a heap, according to yet another embodiment of the invention.

FIG. 7 is a flowchart of exemplary steps in a method 700 for obtaining a block of memory from the heap, according to yet another embodiment of the invention. In general, when a user requests an allocation of memory, the heap-allocation procedure determines whether a portion of a block of memory allocated to the heap can be utilized to satisfy the request. If so, the method, after start at step 702, continues by determining the block header address at step 704 and locating the corresponding descriptor in the descriptor table at step 706. The blockID in the descriptor table is compared with its corresponding entry in the registration table belonging to the process making the memory request at step 708. If there is a match, the method halts (branch to step 718). Otherwise, if it is determined that the corresponding entries in the descriptor table and registration table do not match, then a determination is made at step 710 as to whether the entry is a stale entry that should be removed (i.e., determine whether blockId is greater than zero). The entry is removed at step 712 if the entry is determined to be a stale entry. For example, in the context of uDAPL, it is determined whether the existing LMR and RMR are now outmoded and need to be eliminated from the table, in which case the appropriate uDAPL APIs are called (DAT_RMR_FREE and DAT_LMR_FREE) to release the RMR and LMR using their respective handles entered in the registration table.

At step 714, the block of memory is registered. In the specific context of uDAPL, the appropriate uDAPL API can be utilized to register the block of memory and obtain a new LMR and a new RMR; DAT_LMR_CREATE to create the new LMR, DAT_RMR_CREATE to create the new RMR. Another uDAPL API (DAT_RMR_BIND) can be utilized to bind the RMR to the LMR. Thus, the allocated memory is registered and pinned at this point. The LMR and RMR handles can be stored along with the LMR context and the RMR context in the appropriate registration table. The blockId from the descriptor table entry is stored in the corresponding registration table entry to indicate that this is the block that has been registered at step 716. The method concludes at step 718. At this point the heap allocation process can return the memory allocation to a user. In the context of uDAPL, since the process has registered the allocated portion of memory at this point, the allocated portion of memory can be used for RDMA communications.

As already noted, when an allocated portion of a block of memory is returned to the heap, other registrations by other processes are left in the respective registration tables of the other processes. Thus, no synchronization is required.

Releasing Memory to the OS

When the heap-allocation procedure determines that a block of memory can be released from the heap to the OS, additional steps can be followed. From the address of the block of memory, the block header address can be determined using known pointer arithmetic and, accordingly, the correct location or index value of the entry in the descriptor table determined. In the uDAPL context, a look-up procedure can be performed to find the registration table entry, and appropriate APIs can be called to release the RMR and LMR using the handles in the registration table. In the registration table the blockId can be set to zero. Appropriate OS APIs can be utilized to unpin the block of memory, and then release it back to the OS (including de-committing the memory if desired). Other registered processes may still hold registrations (e.g., MRs in the uDAPL context) corresponding to the released memory in their respective registration tables. However, as already noted, in processes such as those based on the uDAPL standard, memory release (i.e., the actual unpinning or unfreezing of memory) and process deregistration are uncoupled. The invention utilizes this feature to avoid the need for synchronization: the memory can be released, and deregistration can be handled independently at a latter time. According to the invention, the blockPtr at this point can be set to NULL, the blocksz set to zero in the descriptor table entry, and the blockId incremented by a predetermined integer value.

Look-Up (uDAPL Context)

In the specific context of uDAPL, use of a particular portion of memory allocated from the heap for an RDMA operation using uDAPL APIs requires knowledge of the LMR or RMR context for that portion of memory. According to another embodiment, this information can be readily obtained. First, the address of the block of memory containing the desired portion of memory can be determined. The address of the block of memory can then be used to determine the block header address using known pointer arithmetic and the descriptor table location position or index can thus be found. A look-up procedure can be performed on the corresponding registration table entry and the LRM and RMR context values contained therein can be returned. The same procedure can be used to return the LRM and RMR handles.

Cleanup Procedure

The heap itself and the blocks of memory that were contained therein can be released using known processes. Additionally when a process is terminated, for each entry in the corresponding registration table having a blockId greater than zero, the appropriate API can be called to release the registrations contained therein. For example, in the specific context uDAPL, DAT_RMR_FREE and DAT_LMR_FREE can be called to release the RMR and LMR using the handles found in the registration table of that process. The blockId is then set to zero. The memory allocated to storing the registration table can then be released. Likewise, when the last process terminates, the memory allocated to storing the descriptor table can be released.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A method for dynamically managing memory to support one or more processes executing in a remote direct memory access (RDMA) environment, the method comprising the steps of:
   inserting a descriptor in a shared descriptor table, the descriptor corresponding to a block of memory allocated to a heap by an operating system;
   in response to allocating a portion of the block of memory from the heap to a process, determining whether the process has an existing registration with an application program interface for the block of memory, and if the process has no existing registration, registering the process with the application program interface and storing a registration corresponding to the block of memory in a private registration table of the process; and
   in response to the process releasing the allocated portion of the block of memory to the operating system, de-registering with the application program interface and removing the registration from the private registration table;
   wherein, when the block of memory is released to the operating system, other registrations corresponding to the block of memory in other private registration tables of other processes remain in the other private registration tables.

2. The method of claim 1, further comprising the steps of:
   prior to storing the registration, determining whether the private registration table contains a different registration at a location in the private registration table that corresponds to a location of the descriptor in the shared descriptor table, wherein the location in the private registration table and the location in the shared descriptor table are identified by a common location identifier; and
   if the private registration table contains a different registration, removing the different registration.

3. The method of claim 1, wherein the operating system allocates a memory block directly to the process and, in response thereto, comprising the steps of:
   prior to allocating the memory block to the process, determining whether the private registration table contains a different registration at a location in the registration table that corresponds to a location of the descriptor in the shared descriptor table, wherein the location in the private registration table and the location in the shared descriptor table are identified by a common location identifier; and
   if the private registration table contains a different registration, removing the different registration.

4. The method of claim 1, further comprising the step of generating a header corresponding to the block of memory, the header comprising a value indicating a location of the descriptor in the shared descriptor table and the location of a corresponding registration in the private registration table of a process.

5. The method of claim 4, further comprising the step of generating the shared descriptor table such that the shared descriptor table comprises an entry at the indicated location, and when one or more other blocks of memory are allocated to the heap, generating one or more corresponding entries such that each entry uniquely corresponds to a single block of memory.

6. The method of claim 5, wherein generating the shared descriptor table comprises the step of generating for a particular block of memory an entry comprising a block identifier identifying the particular block of memory, a block pointer pointing to a memory address of the particular block of memory, and a block size indicating the size of the particular block of memory.

7. The method of claim 1, wherein the process comprises a plurality of processes, and further comprising the step of generating for each of the processes a corresponding private registration table such that each private registration table uniquely corresponds to a single process.

8. The method of claim 1, wherein the application program interface conforms to a User Direct Access Programming Library (uDAPL) standard, and further comprising:
   allocating a portion of memory defining a Local Memory Region (LMR) allocated for local memory access;
   allocating another portion of memory defining a Remote Memory Region (RMR), allocated for remote memory access; and
   binding the LMR and RMR.

9. A computer-based system for dynamically managing memory to support one or more processes executing in a remote direct memory access environment, the system comprising:
   a memory for electronically storing executable processing instructions;
   a processor for executing at least one process based upon the executable processing instructions;

a descriptor module for causing the processor to store a descriptor in a shared descriptor table, the descriptor uniquely corresponding to a block of the memory allocated to a heap; and a registration module configured to respond to a process request for an allocation of a portion of the block of memory from the heap by determining whether the process has an existing registration for the block of memory with an application program interface, and if the process has no existing registration, storing a registration corresponding to the block of memory in a private registration table of the process, the registration module being further configured to remove the registration from the private registration table in response to the process releasing the allocated portion of the block of memory to an operating system executed by the processor and de-registering with the application program interface;

wherein, when the block of memory is released to the operating system, other registrations corresponding to the block of memory in other private registration tables of other processes remain in the other private registration tables.

10. The system of claim 9, wherein the registration module is configured to, prior to storing the registration, determine whether the private registration table contains a different registration at a location in the private registration table that corresponds to a location of the descriptor in the shared descriptor table, and if the private registration table contains a different registration, to remove the different registration from the private registration table, wherein the location in the private registration table and the location in the shared descriptor table are identified by a common location identifier.

11. The system of claim 9, wherein, if the operating system allocates a memory block directly to the process, the registration module is configured to determine whether the private registration table contains a different registration at a location in the registration table that corresponds to a location of the descriptor in the shared descriptor table, and if the private registration table contains a different registration, to remove the different registration, wherein the location in the registration table and the location in the shared descriptor table are identified by a common location identifier.

12. The system of claim 9, wherein further comprising a header-generating module configured to generate a header corresponding to the block of memory, the header comprising a value indicating a location of the descriptor in the shared descriptor table and the location of a corresponding registration in the private registration table of a process.

13. A non-transitory computer-readable storage medium having embedded therein computer-executable code that, when loaded to and executed by the computer, cause the computer to perform the steps of:

inserting a descriptor in a shared descriptor table, the descriptor corresponding to a block of memory allocated to a heap by an operating system;

in response to allocating a portion of the block of memory from the heap to a process, determining whether the process has an existing registration with an application program interface for the block of memory, and if the process has no existing registration, registering the process with the application program interface and storing a registration corresponding to the block of memory in a private registration table of the process; and in response to the process releasing the allocated portion of the block of memory to the operating system and de-registering with the application program interface, removing the registration from the private registration table;

wherein, when the block of memory is released to the operating system, other registrations corresponding to the block of memory in other private registration tables of other processes remain in the other private registration tables.

14. The non-transitory computer-readable storage medium of claim 13, further comprising computer-executable code for causing the computer to perform the steps of:

prior to storing the registration, determining whether the private registration table contains a different registration at a location in the private registration table that corresponds to a location of the descriptor in the shared descriptor table, wherein the location in the private registration table and the location in the shared descriptor table are identified by a common location identifier; and if the private registration table contains a different registration, removing the different registration.

15. The non-transitory computer-readable storage medium of claim 13, wherein the operating system allocates a memory block directly to the process and further comprising computer-executable code for causing the computer, in response to the operating system allocating the memory, to perform the steps of:

prior to allocating the memory segment memory block to the process, determining whether the registration table contains a different registration at a location in the private registration table that corresponds to a location of the descriptor in the shared descriptor table, wherein the location in the private registration table and the location in the shared descriptor table are identified by a common location identifier; and if the private registration table contains a different registration, removing the different registration.

16. The non-transitory computer-readable storage medium of claim 13, further comprising computer-executable code for causing the computer to perform the step of generating a header corresponding to the block of memory, the header comprising a value indicating a location of the descriptor in the shared descriptor table and the location of a corresponding registration in the private registration table of a process.

17. The non-transitory computer-readable storage medium of claim 16, further comprising computer-executable code for causing the computer to perform the step of generating the shared descriptor table such that the shared descriptor table comprises an entry at the indicated location, and when one or more other blocks of memory are allocated to the heap, generating one or more corresponding entries such that each entry uniquely corresponds to a single block of memory.

18. The non-transitory computer-readable storage medium of claim 17, wherein generating the shared descriptor table comprises the step of generating for a particular block of memory an entry comprising a block identifier identifying the particular block of memory, a block pointer pointing to a memory address of the particular block of memory, and a block size indicating the size of the particular block of memory.

19. The non-transitory computer-readable storage medium of claim 13, wherein the process comprises a plurality of processes, and further comprising computer-executable code for causing the computer to perform the step of generating for each of the processes a corresponding private registration table such that each private registration table uniquely corresponds to a single process.

20. The non-transitory computer-readable storage medium of claim 13, wherein the application program interface conforms to a User Direct Access Programming Library (uDAPL) standard, and further comprising:

allocating a portion of memory defining a Local Memory Region (LMR) allocated for local memory access;

allocating another portion of memory defining a Remote Memory Region (RMR), allocated for remote memory access; and binding the LMR and RMR.

\* \* \* \* \*